United States Patent
Kyong et al.

(10) Patent No.: US 7,009,916 B2
(45) Date of Patent: Mar. 7, 2006

(54) OPTICAL PICKUP DEVICE

(75) Inventors: Chon-Su Kyong, Seoul (KR); Seung-Man Oh, Suwon-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 616 days.

(21) Appl. No.: 10/179,302

(22) Filed: Jun. 26, 2002

(65) Prior Publication Data

US 2003/0128636 A1   Jul. 10, 2003

(30) Foreign Application Priority Data

Jan. 7, 2002   (KR) .................................. 2002-0000792

(51) Int. Cl.
*G11B 7/00* (2006.01)

(52) U.S. Cl. .............................. 369/44.23; 369/112.09; 369/112.28

(58) Field of Classification Search .............. 369/44.37, 369/44.23, 44.24, 44.12, 112.28, 112.01, 369/112.09, 112.14, 112.21, 103
See application file for complete search history.

(56) References Cited

U.S. PATENT DOCUMENTS

| | | | | |
|---|---|---|---|---|
| 5,062,096 A | * | 10/1991 | Takagi ..................... | 369/44.12 |
| 5,814,807 A | * | 9/1998 | Musha et al. ............ | 369/44.23 |
| 6,445,674 B1 | * | 9/2002 | Morita ....................... | 369/71 |

FOREIGN PATENT DOCUMENTS

JP          61269238 A   *   11/1986

\* cited by examiner

*Primary Examiner*—Thang V. Tran
(74) *Attorney, Agent, or Firm*—Morgan, Lewis & Bockius LLP

(57) ABSTRACT

An optical pickup device including a lead frame and a board attached to the lead frame is provided. The lead frame includes optical components, such as a laser diode and an optical element, which are disposed within a lead frame. A photo diode is mounted on the board to receive a beam transmitted through the optical element. The board is adjusted with respect to the lead frame using the beam before attached to the lead frame. An upper opening and a lower opening are formed on an upper side and a lower side of the lead frame, respectively. An optical element installation space formed within the lead frame and defined by an upper side walls and an optical element support. A hole is formed in a central portion of the optical element support and communicates with the optical element installation space and a photo diode installation space which is defined by the optical element support and a lower side wall of lead frame. The laser diode emitting the beam is mounted on a laser diode support which is formed adjacent to the optical element support in the optical element installation space. The optical element mounted on the optical element support is disposed within the optical element installation space to direct the laser beam emitted from the laser diode toward an optical medium through upper opening and to transmit the laser beam to the photo diode of the board.

21 Claims, 8 Drawing Sheets

OPTICAL PICKUP DEVICE

BACKGROUND OF THE INVENTION

1. Field of the Invention

This invention relates to an optical pickup device, and more particularly to an optical pickup device having a lead frame, a laser diode die-bonded to the lead frame, and a photo detector attached to the lead frame.

2. Description of the Prior Art

An optical pickup device has been used for generating a laser beam to store information into an optical medium, such as an optical disk, and for detecting the laser beam reflected from the optical medium to read the information stored in the optical medium.

Figure 1:
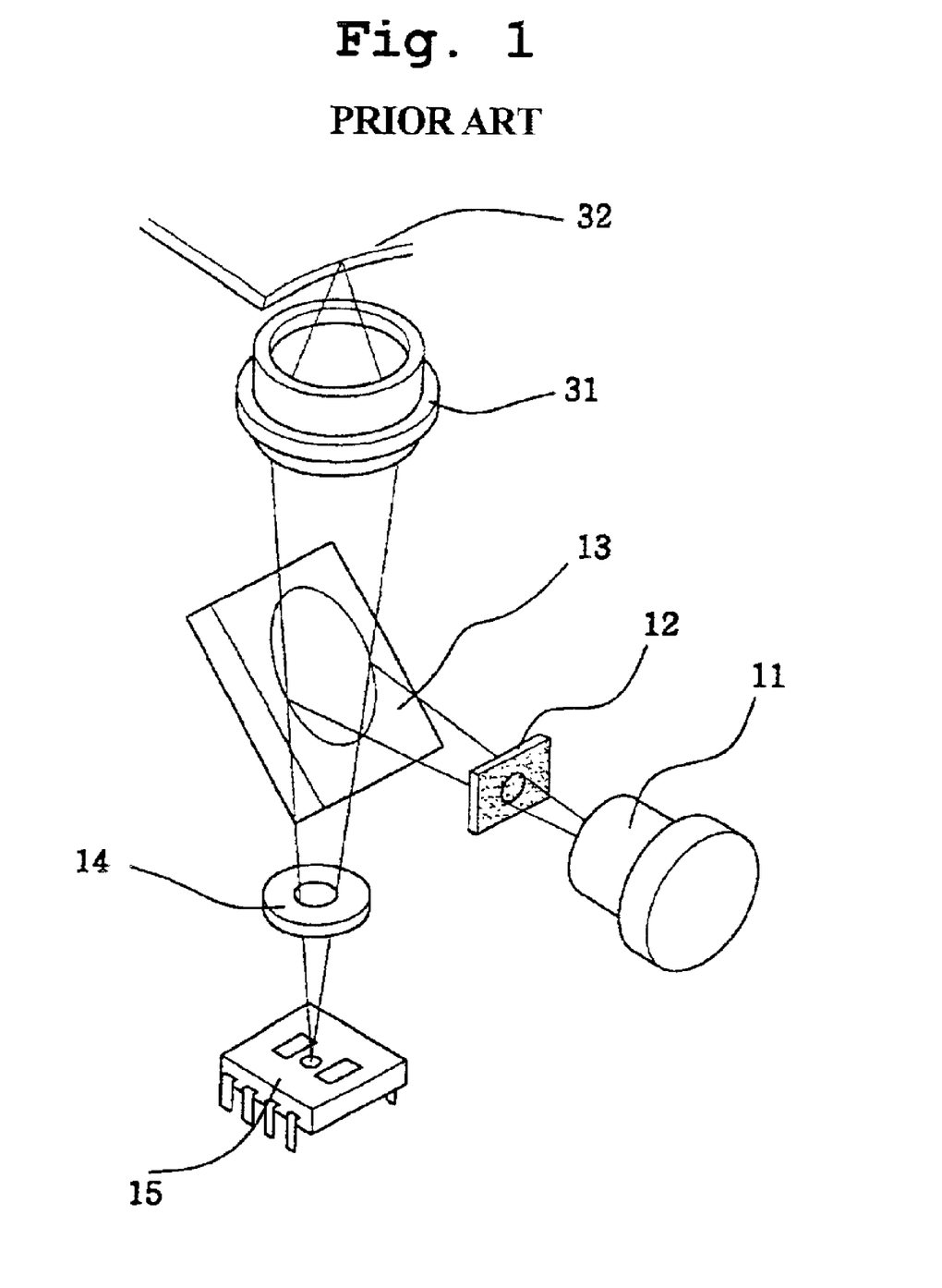
FIG. 1 is a partial perspective view of a conventional optical pickup device.

A conventional optical pickup device as shown in FIG. 1 includes a laser diode (LD) 11 generating a laser beam, a diffraction grating element 12 generating from the laser beam three beams having a zero order beam and positive and negative first order beams, a beam splitter 13 reflecting the three beams toward an optical medium 32 and transmitting the three beams reflected from optical medium 32 into a photo diode (PD) 15, an objective lens 31 disposed between beam splitter 13 and optical medium 32 to converge the three beams onto optical medium 32, and a concave lens 14 disposed between beam splitter 13 and photo diode 15 to generate an astigmatism in response to the beams reflected from optical medium 32.

The laser beam emitted from LD 11 is incident to optical medium 32 through diffraction grating element 12, beam splitter 13, and objective lens 31. The beams reflected from optical medium 32 are detected by PD 15 through objective lens 31, beam splitter 13, and concave lens 14.

This conventional optical pickup device, however, is disadvantageous that the optical pickup device can not become thin or slim because of the great number of components forming the optical pickup device. Moreover, the manufacturing cost of the optical pickup device is disadvantageous because of the complicated structure of the optical pickup device.

Figure 2:
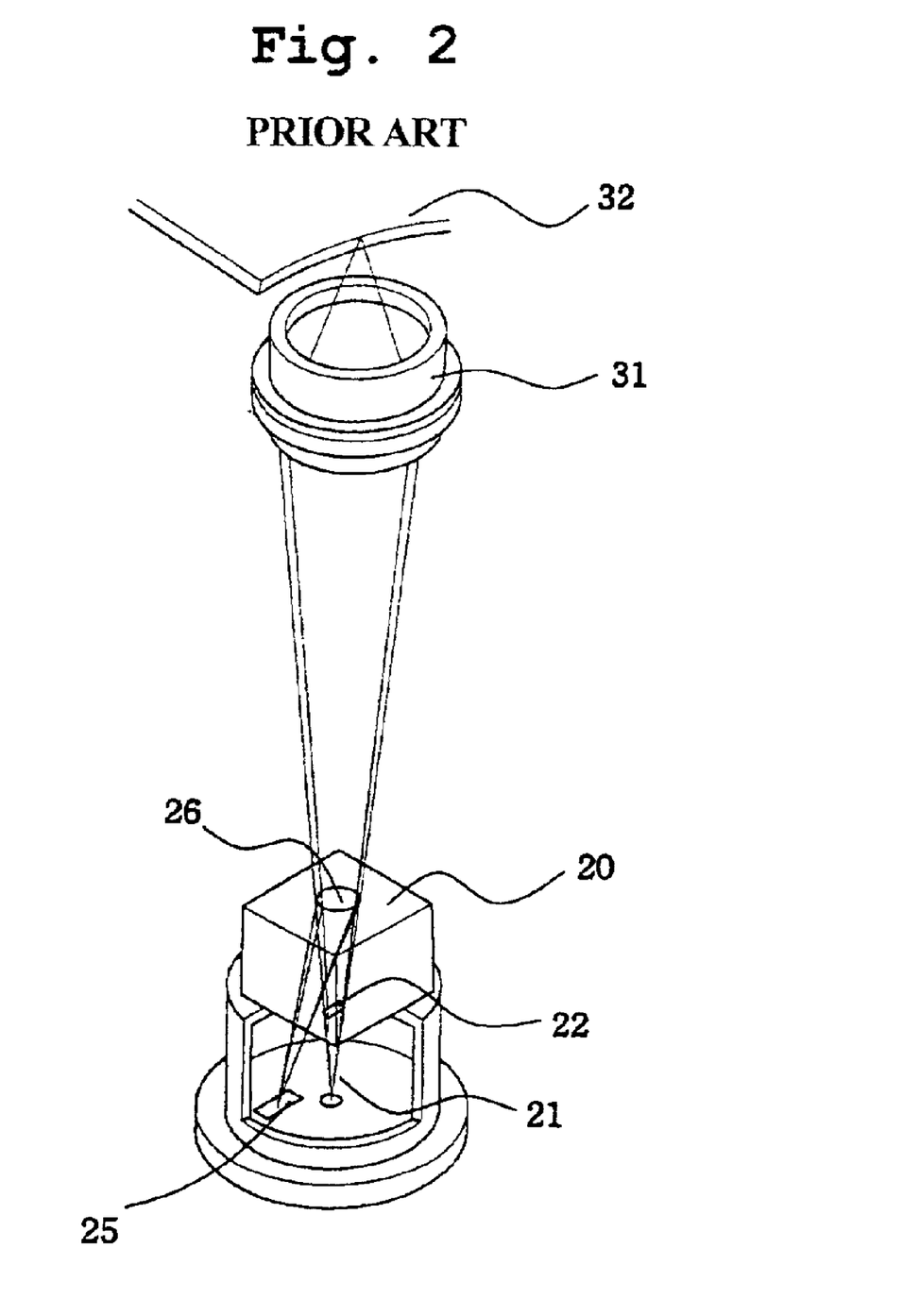
FIG. 2 is a partial perspective view of a conventional hologram pickup device.

In an effort of reducing the number of components of the optical pickup device disposed on an optical path, a hologram pickup device using a hologram method had been introduced in the conventional optical device. The number of the complicated components used in the conventional optical pickup device is removed from the hologram pickup device because the beam splitter and the concave lens are not necessary in the hologram pickup device. The reflected beam from the optical medium is detected by the photo diode after diffracted by the hologram as shown in FIG. 2.

The hologram pickup device includes a laser diode (LD) 21 emitting a laser beam, a hologram optical element (HOE) 20 disposed between LD 21 and an optical medium 32, a diffraction grating element 22 formed on a lower surface of HOE 20 to generate a plurality of tracking beams from the laser beam, a hologram 26 formed on an upper surface of HOE 20 to diffract the reflected beam, and a photo diode (PD) 25 detecting the diffracted beam. LD 21 and PD 25 are die-bonded to a single common substrate. LD 21, PD 25, hologram 26, and diffraction grating element 22 disposed on an optical path are integrated in a single package.

In this hologram pickup device, the laser beam emitted from LD 21 is divided into three beams by diffraction grating element 22, and the divided beams are converged into optical medium 32 through objective lens 31. The converged beams are reflected from optical medium 32, and the reflected beams are detected by PD 25 after diffracted by hologram 26. Since the diffracted beams are detected at PD 25, the beam splitter and the concave lens are removed from the optical device. Therefore, the number of the optical components of the hologram pickup device is reduced compared to the conventional optical device. Moreover, the structure of the optical device may be simplified, and the manufacturing cost may be lowered since LD 21, PD 25, hologram 26, and diffraction grating element 22 are formed in the single package.

The hologram pickup device, however, requires to precisely arrange LD 21 and PD 25 in the single package in order to allow PD 25 to accurately detect the diffracted beams since PD 25 is mounted on a position relative to LD 21 after LD 21 is die-bonded onto the common substrate. Because the performance of PD 25 for detecting the diffracted beams is subject to the tolerance between relative positions of LD 21 and PD 25, Manufacturing equipment with high precision is necessary to arrange LD 21 and PD 25 at relatively precisely positions on the common substrate.

Since the performance of the hologram pickup device is depending on the tolerance of the components, the manufacturing process using the manufacturing equipment becomes complicated. Moreover, the relative positions of LD 21 and PD25 must be precisely adjusted to accurately detect the diffracted beams.

Even if PD 25 is die-bonded on a precise position of the common substrate in the manufacturing process, it is not sure whether PD 25 is disposed on a desired position on the single common substrate because the actual diffracted beams generated by hologram 26 and LD 21 are not used in the manufacturing process. Once PD 25 is die-bonded on the single common substrate, the position of PD 25 can not be adjusted when PD 25 can not accurately detect the diffracted beams during testing or using the hologram pickup device.

Since the hologram pickup device is integrated into the single package using the complicated manufacturing process, Furthermore, it is disadvantageous that it cost too much to use the manufacturing equipment for die-bonding LD 21 and PD 25 at precise positions on the single common substrate.

As described above, it is disadvantageous that it costs too much to use the manufacturing equipment for die-bonding of LD 21 and PD 25 and to adjust the relative positions of LD 21 and PD 25, and that the manufacturing process becomes complicated because LD 21 and PD 25 are integrated in the single common substrate using a wafer process.

SUMMARY OF THE INVENTION

It is an object of the present invention to provide an improved optical pickup device able to mount a photo diode on a desired position of a lead frame by monitoring and using a beam generated from a laser diode of the lead frame.

It is another object to provide an optical pickup device able to eliminate a hologram optical element.

It is still another object to provide an optical pickup device able to reduce the manufacturing cost and time of a module having a laser diode and a photo diode.

It is yet another object to provide an optical pickup device able to generate an astigmatism by using a concave surface formed on a side of an optical element disposed between a photo diode and an optical medium.

It is still yet another object to provide an optical pickup device able to prevent a half portion of a beam reflected from an optical disk from being impinged on a photo diode and to allow another half portion of the beam to be impinged on the photo diode by using a knife edge element formed on a side of an optical element facing the photo diode and disposed between the optical disk and the photo diode.

It is also an object to provide an optical pickup device able to reduce the number of optical components disposed on an optical path of a laser beam emitted from a laser diode.

It is further object to provide an optical pickup device able to reduce the size and the volume of the optical pickup device.

These and other objects of the present invention may be achieved by providing an optical pickup device having a lead frame and a photo diode attached to the lead frame. A board mounted with the photo diode is moved with respect to the lead frame by monitoring and using a beam emitted from a laser diode die-bonded on the lead frame until the photo diode mounted on the board is located on a desired position of the lead frame to accurately receive the beam.

The lead frame includes an upper opening and a lower opening formed on an upper side and a lower side of the lead frame, respectively. An optical element installation space is formed within lead frame and defined by upper side walls and an optical element support. A through hole is formed in a central portion of the optical element support and communicates with both optical element installation space and a photo diode installation space which is defined by a bottom of the optical element support and lower side walls of the lead frame. The photo diode installation space communicates with the lower opening and the through hole of the optical element support. A common axis passes through each center of the upper opening, the optical element installation space, the through hole of the optical element support, the photo diode installation space, and the lower opening.

The laser diode emitting a laser beam is mounted on a laser diode support which is formed on one of upper side walls or on the optical element support within the optical element installation space. The laser diode is die-bonded to said lead frame. An optical element is mounted on the optical element support and disposed within optical element installation space to direct the laser beam emitted from laser diode toward an optical medium through the upper opening.

The optical element having a shape of a hexahedron includes a first side, a second side, and a third side. The first side is disposed between and perpendicular to both second and third sides while the second and third sides are parallel to each other. The first side of the optical element faces the laser diode to receive the laser beam. The second side faces an optical medium through the upper opening of the lead frame to transmit the laser beam and receive the beam reflected from the optical medium. The third side of the optical element faces a photo diode. The optical element is made in a single body.

A diffraction grating is integrated with the first side of the optical element and divides the laser beam into three beams including a zero order beam and negative and positive first order beams. The laser beam emitted from the laser diode passes through the diffraction grating and is converted into three beams which are directed toward the optical medium through the second side of the optical element.

The third side of the optical element is formed with an error beam generating element which generating an error beam in response to an beam reflected from optical medium same as a knife edge element or a concave surface. For example, the knife edge element of the third side of the optical element divides the third side into two sections to prevent a half of the reflected beam from passing through one section of the two sections while another half of the reflected beam passing through the other section of the two sections is passed toward the lower opening through the photo diode installation space. With another half of the reflected beam passed through the other section of the third side of the optical surface, it is determined whether a beam spot impinged on the optical medium is focused or not. The concave surface of the third side of the optical element generates an astigmatism with which the photo diode detects error signals occurred in the optical oath. The error beam generating element is integrated with optical element in a single body.

A transparent cover is attached to the top surface of the lead frame to cover an upper opening of the optical element and to prevent foreign materials from being introduced into the optical element installation space through the upper opening. The photo diode is disposed in the photo diode installation space to receive the reflected beam passing through the third side of the optical element. The photo diode converts the beam into electrical signals.

BRIEF DESCRIPTION OF THE DRAWINGS

A more complete appreciation of the invention, and many of the attendant advantageous thereof, will be readily apparent as the same becomes better understood by reference to the following description when considered in conjunction with the accompanying drawings in which like reference symbols indicate the same or similar components, wherein.

DETAILED DESCRIPTION OF THE INVENTION

Figure 3:
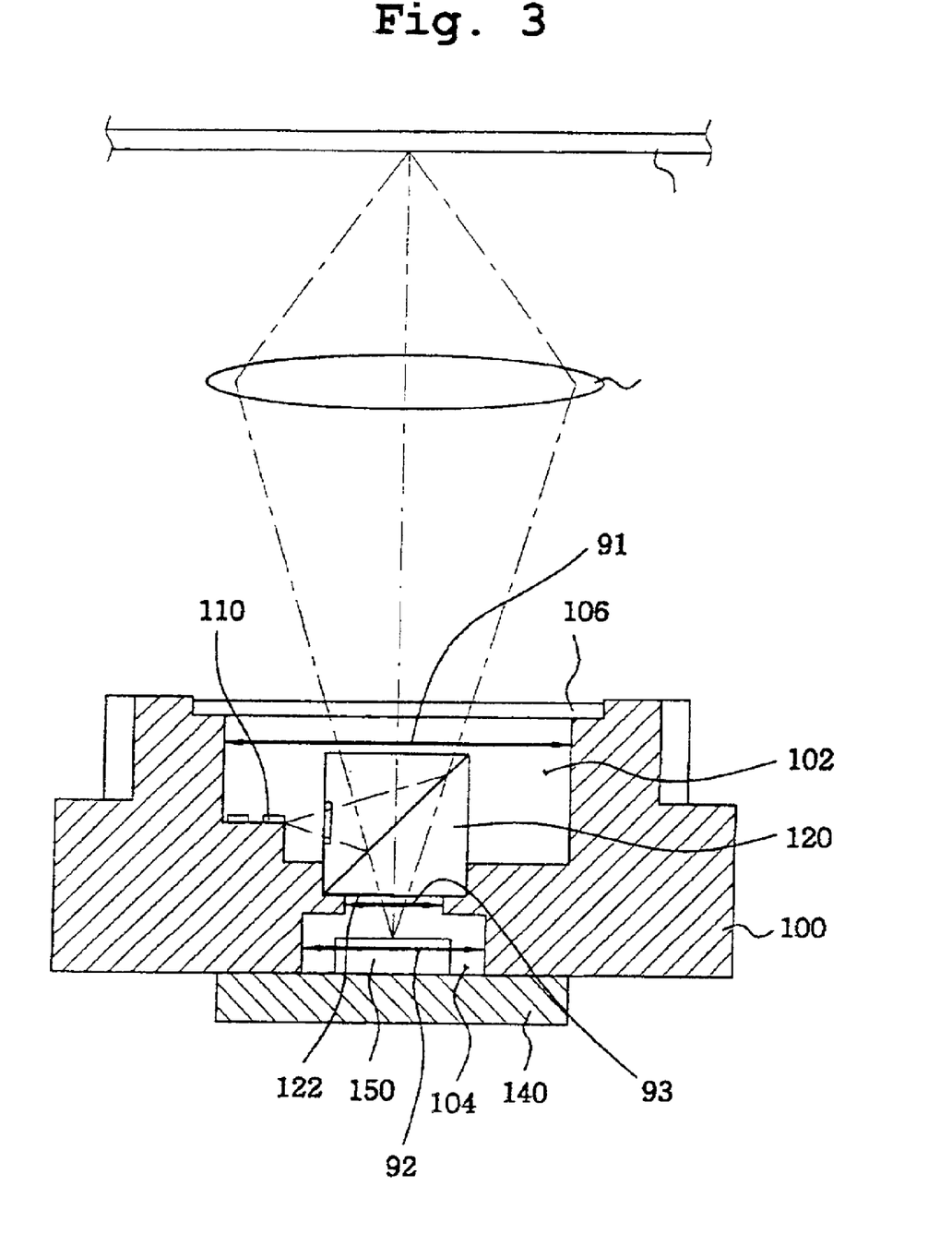
FIG. 3 is a font view of an optical pickup device constructed according to the principles of the present invention.
Figure 4:
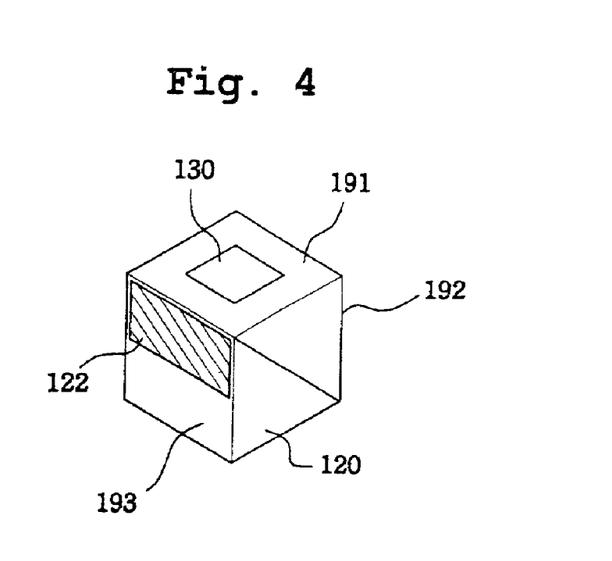
FIG. 4 is a perspective view of an optical element of FIG. 3.

FIGS. 3 and 4 show a module including optical components, such as a laser diode 110 and an optical element 120, which are disposed within a lead frame 100. A photo diode 150 is coupled to lead frame 100. An upper opening 91 and a lower opening 92 are formed on an upper side walls 107 and a lower side walls 109 of lead frame 100, respectively. An optical element installation space 102 is formed within lead frame 100 and defined by upper side walls 107 and an optical element support 108. A hole 93 is formed in a central portion of optical element support 108 and communities with both optical element installation space 102 and a photo diode installation space 104 which is defined by optical element support 108 and lower side walls 109 of lead frame 100. A common axis passes through each center of upper opening 91, installation space 102, hole 93 of optical element support 108, photo diode installation space 104, and lower opening 92.

A laser diode 110 emitting a laser beam is mounted on a laser diode support 118 which is formed adjacent to optical element support 108 in optical element installation space 102. The laser diode 110 is die-bonded to said lead frame 100. An optical element 120 mounted on optical element support 108 is disposed within optical element installation space 102 to direct the laser beam emitted from laser diode 110 toward an optical medium 32 through upper opening 91.

Optical element 120 having a shape of a hexahedron includes a first side 191, a second side 192, and a third side 193. The first side 191 is disposed between and perpendicular to both second and third sides 192, 193 while the second and third sides 192, 193 are parallel to each other. The first side 191 of optical element 120 faces laser diode 110. The second side 192 faces an optical medium through upper opening 91 of the upper side of lead frame 100. the third side 193 faces a photo diode 150. The optical element 120 is made in a single body.

A diffraction grating 130 is integrated with the first side 191 of optical element 120 and divides the laser beam into three beams including a zero order beam and negative and positive first order beams. The laser beam emitted from laser diode 110 passes through diffraction grating 130 and is converted into three beams which is directed toward optical medium through the second side 192 of optical element 120.

A knife edge element 122 is disposed on the third side 193 of optical element 120 to block a half of the reflected beam passing through the third side 193 of optical element 120. Knife edge element 122 divides an optical surface formed on the third side 193 into two half portions. A first half portion of the optical surface allows the reflected beam to be passed toward lower opening 92 while a second half portion of the optical surface prevents the reflected beam from being passed toward lower opening 92 through photo diode installation space 104. The optical surface represents an area formed on the third side of optical element 120 through which the beam reflected from optical medium 32 passes. Knife edge element 122 is not disposed on the second half portion of the optical surface. Therefore, with the beam passing through the first half portion of the optical surface, it is determined whether a beam spot impinged on optical medium 32 is focused or not.

A transparent cover 116 is attached to a top surface 105 of lead frame 100 to cover upper opening 91 of optical element 120 and to prevent foreign materials from being introduced into optical element installation space 102 through upper opening 91. Photo diode PD 140 is disposed in photo diode installation space 104 to receive the reflected beam passing through the third side of optical element 120. PD 150 converts the beam into electrical signals in response to the shape and intensity of the beams.

A beam detecting board 140 is attached to a bottom surface 106 of lead frame 100 after the beam passing through the third side of optical element 120 is accurately received by a photo diode 150 mounted on beam detecting board 140. Beam detecting board 140 moves with respect to lead frame 100 and optical element 120 before attached to the bottom surface 106 of lead frame 100. Using the beam reflected from optical medium 32 and passing through the third side of optical element 120 in the manufacturing process, the precise position of photo diode 150 of beam detecting board 140 with respect to optical element 120 and lead frame 100 may be determined. When beam detecting board 140 are disposed on the accurate position and when photo diode 150 accurately receives the beam passing through the third side 193 of optical element 120 and photo diode installation space 104, beam detecting board 140 is attached to the bottom surface 106 of lead frame 100, Photo diode 150 mounted on an upper surface of beam detecting board 140 faces the third side of optical element 120 to receive the beam from optical element 120. Beam detecting board 140 may be made of a chip-on-board.

An objective lens 31 is disposed between optical medium 32 and the second side of optical element to converge the beam emitted from laser diode 110 onto optical medium 32 along an optical axis parallel to the common axis. The optical axis between laser diode 110 and optical element 120 is perpendicular to the common axis.

The operation of the optical pickup device constructed according to the principles of the present invention is explained hereinafter. A laser beam emitted from laser diode 110 is divided into zero order beam and positive and negative first order beams which are converged onto optical medium 32 through objective lens 31 after reflected by optical element 120. The beam converged onto a track of optical medium 32 is reflected along the optical axis and impinged on photo diode 150 after transmitted through optical element 120. Photo diode 150 converts the intensity of the reflected beam into electrical signals which are used for tracking, focusing, and data reading.

Due to the tolerance of each components of optical pickup device, errors are occurred when the beam emitted from laser diode 110 travels through optical element 120, objective lens 31, optical medium 32, and photo diode 150. Errors are corrected when beam detecting board 140 having photo diode 150 is adjusted with respect to lead frame 100 and optical element 120 by monitoring the beam generated from laser diode 110 and impinged on photo diode 150 before the beam detecting board 140 is attached to lead frame 100 using a coupling element, such an adhesive or a screw.

Moreover, the position of the beam detecting board 140 is precisely adjusted with respect to the lead frame 100 because the beam emitted from the laser diode 110 and transmitted through optical element 120 is used during the manufacturing process of the optical pickup device. The beam is accurately landed on a desired portion of photo diode 150 without the errors caused by the tolerance. Therefore, accurate shape of the beam is obtained by the photo diode 150, and also focusing error, tracking error, and RF signals can be obtained from the shape and the intensity of the beam since the beam emitted from laser diode 110 is accurately landed on photo diode 150 of beam detecting board 140 after traveling through diffraction grating 130, optical element 120, objective lens 31, and optical medium 32 along the optical axis, A method of detecting signals for focusing varies in accordance with the structure and the shape of optical element 120. The tracking error signal is obtained from the beam divided by diffraction grating 130 when the beam is detected by photo detector 150.

FIG. 4 shows knife edge element 122 for allowing photo diode 150 to detect error signals. The third side 193 is divided into two surfaces by knife edge element. The first portion of the third side 193 of optical element 120 is covered by knife edge element 122 while the second portion of the third side 193 of optical element 120 is not covered by knife edge element 122. An edge of knife edge element 122 is disposed adjacent to the optical axis and the common axis to divide the third side 193 into about two half surface areas.

Figure 5:
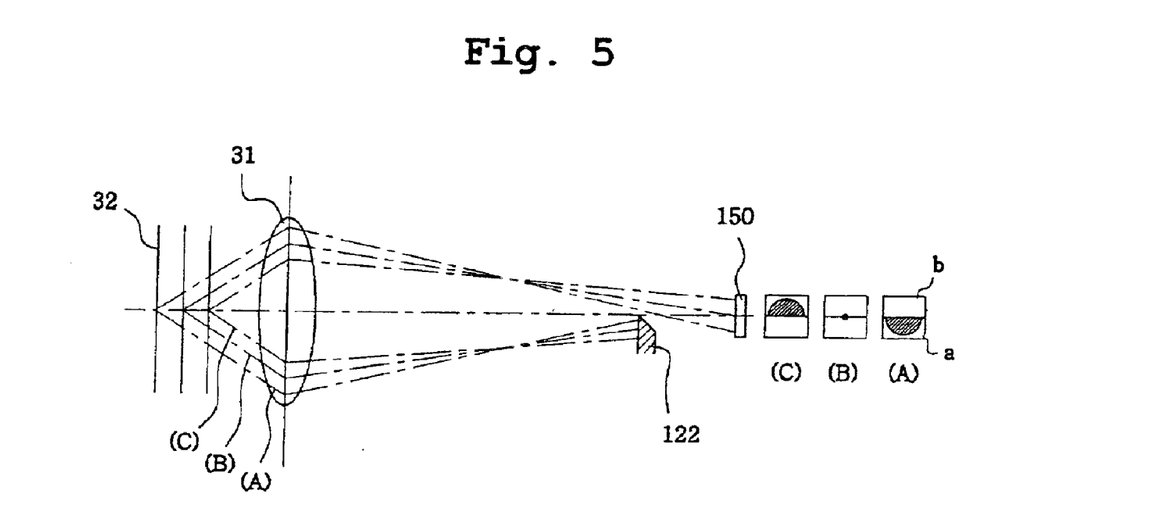
FIG. 5 is a schematic diagram showing a knife edge method adapted for use the optical element of FIG. 3.

As shown in FIG. 5, a half portion of the beam is not transmitted through knife edge element 122 while the other half portion of the beam is impinged on photo diode 150 of beam detecting board 140 because about a half surface area of the third side 193 of optical element 120 is not covered by knife edge element 122.

When the beam is focused on optical medium 32 by objective lens 31, the shape of the beam landed on photo diode 150 is shown as indicated B, and the output of photo diode 150 is zero. If the beam is not focused on optical medium 32 which is distant from objective lens 31, the shape of the beam landed on photo diode 150 is shown as indicated A, and the output of photo diode 150 is positive. If the beam is not focused on optical medium 32 which is too close to objective lens 31, the shape of the beam landed on photo diode 150 is shown as indicated C, and the output of photo diode 150 is negative.

The formula 1 for generating the output of photo diode 150 is as follows.

$$F1 = a - b,$$

wherein F1 is the output signal of photo diode 150, and a and b are detecting signals detected by two divided detectors of photo diode 150 of FIG. 5.

As described above, it is advantageous to use optical element 120 having knife edge element 122 because the error signals are detected without using the hologram optical element of the conventional optical pickup device. Therefore, the manufacturing cost and time for designing of the hologram optical element is not required.

Since the optical pickup device of the present invention does not use the hologram, the high cost equipment for mounting the laser diode and the photo diode is not needed any more. Moreover, since the position of photo diode 150 can be adjusted by using the beam emitted from laser diode 110 and impinged on photo diode 150, the manufacturing process of the module of the optical pickup device becomes simplified, and the efficiency of assembling and manufacturing the module of the optical pickup device is improved. Furthermore, the volume of the module of the optical pickup device becomes slim and smaller than before because a number of optical components of the optical pickup device disposed on an optical path are integrated into a single module.

Figure 6A:
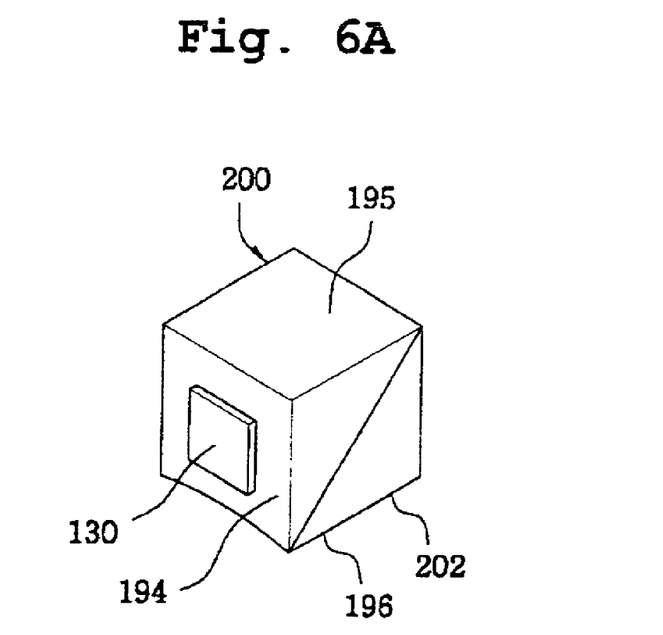
FIGS. 6A and 6B are perspective views showing a second embodiment of the optical element.
Figure 6B:
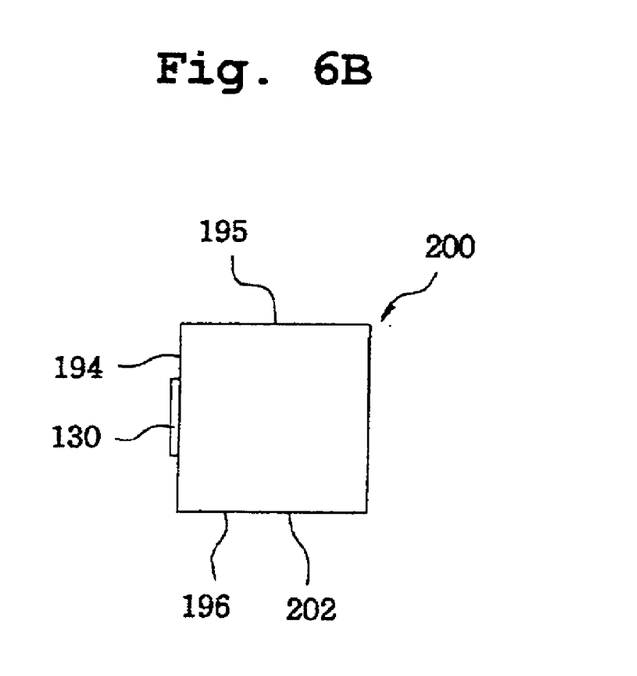

FIGS. 6A and 6B shows a second embodiment of optical element 120 adapted for use in optical pickup device constructed according to the principles of the present invention. The third side 196 of optical element 200 has a concave surface 202 which is the same as a conventional cylindrical lens while the first side 194 is formed with diffraction grating 130 and the second side 195 faces optical medium 32.

Concave surface 202 formed on the third side 196 of optical element 200 operates like as a cylindrical lens or an astigmatism generating element. The error signals are detected by photo diode 150 by using an astigmatism method of concave surface 202 of the third side 196 of optical element 200. A main plane of concave surface 202 is perpendicular to the first side and diffraction grating element 130 of optical element 200 so as to form the optical path and optical axis.

Figure 7A:
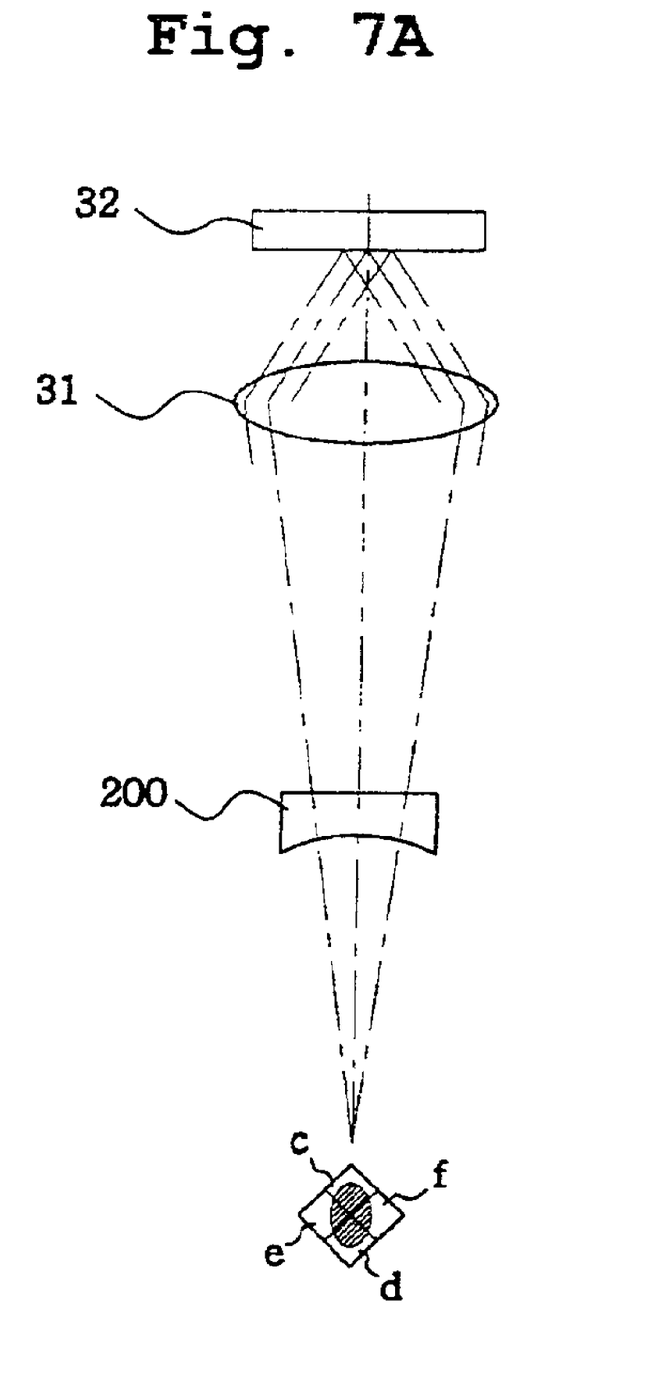
FIGS. 7A, 7B, and 7C are schematic diagrams showing an astigmatic method adapted for use in the optical element of FIGS. 6A and 6B.
Figure 7B:
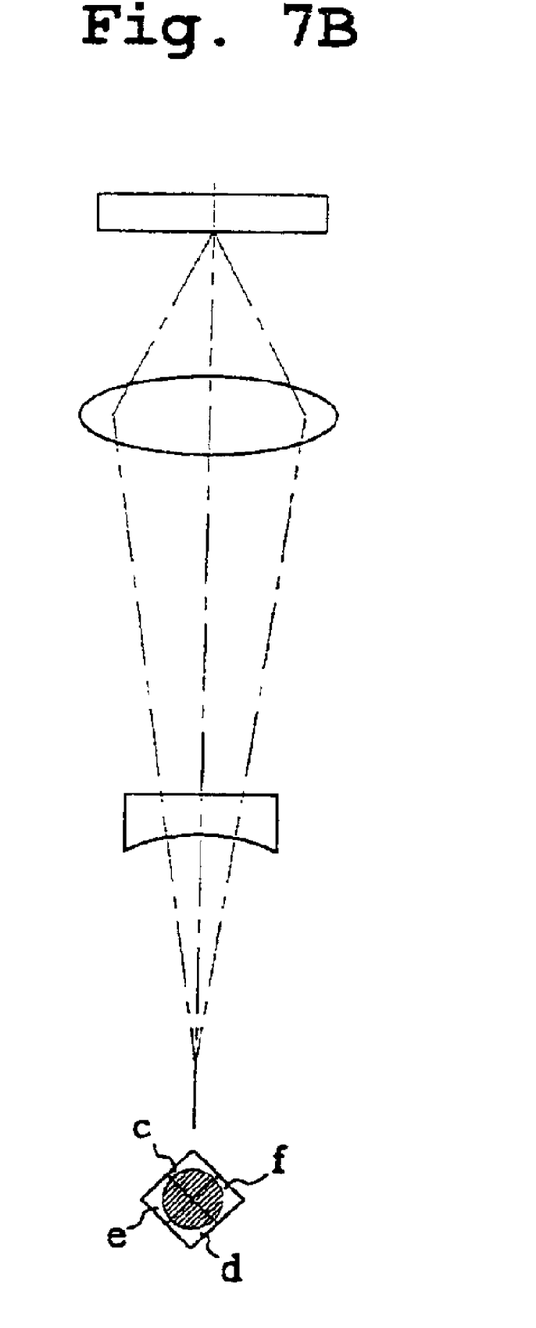
Figure 7C:
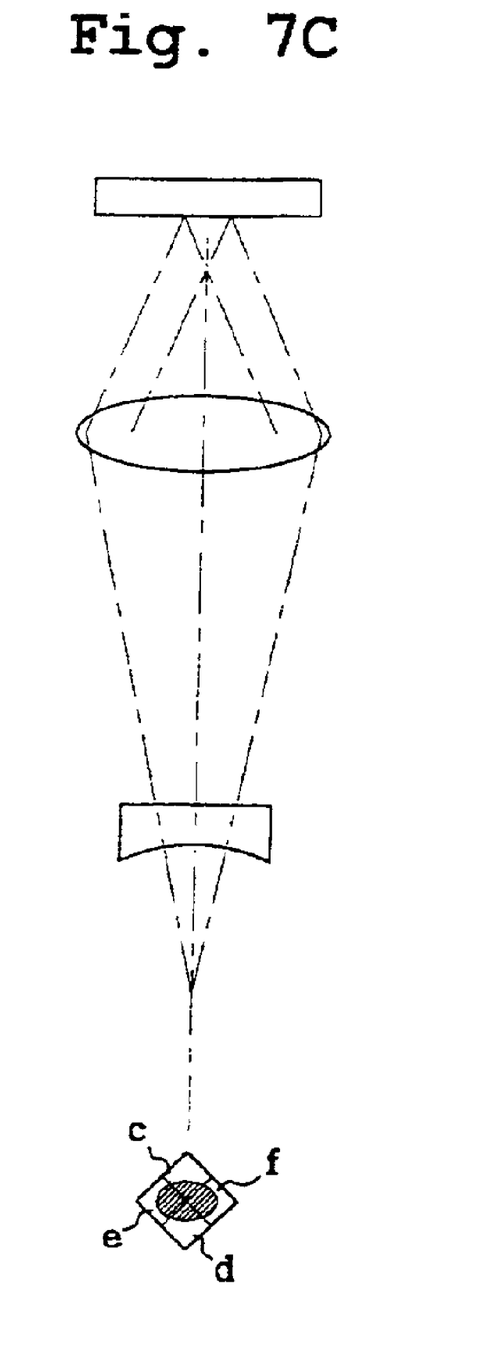

FIGS. 7A, 7B and 7C show a focus error detecting method employing the astigmatism method. Because of concave surface 202 of the third side 196 of optical element 200, the beam passing through concave surface 202 of optical element 200 shows one of various types of beam spots when the beam spot is formed on photo diode 150 in response to the distance between optical medium 32 and objective lens 31.

When the beam is focused on optical medium 32 by objective lens 31, the shape of the beam formed on photo diode 150 shows as indicated FIG. 7B, and the output calculated from four divided detectors c, d, e, f of photo diode 150 is zero because the beam intensity distribution of four divided detectors becomes almost uniform. When the beam is not focused on optical medium 32 which is distant from objective lens 31, the shape of the beam formed on photo diode 150 shows as indicated FIG. 7A, and the output calculated from four divided detectors c, d, e, f of photo diode 150 is positive. If the beam is not focused on optical medium 32 which is too close to objective lens 31, the shape of the beam landed on photo diode 150 shows as indicated FIG. 7C, and the output calculated form four divided detectors c, d, e, f of photo diode 150 is negative. The tracking error signal is obtained from four signals of four divided detectors c, d, e, f of photo diode 150.

The formula 2 for generating the output of photo diode 150 is as follows.

$$F2 = (c+d) - (e+f),$$

wherein F2 is the output signal of photo diode 150, and c, d, e and f of FIGS. 7A, 7B and 7C are signals detected by the four divided portions of photo diode 150.

The operation of the optical pickup device having concave surface 202 of optical element 200 of FIGS. 6A and 6B is the same as the pickup device having optical element 120 as shown in FIGS. 3 and 4 when the beam travels along the optical path before the beam passes respective third sides 193, 196 of optical elements 120, 200.

The optical pickup device constructed according to the principles of the present invention may be adapted for use in DVD-ROM, DVD-RAM, CD-ROM, DVD-RW, CD-RW, etc.

As described above, manufacturing process is simplified and the size of the optical pickup device becomes slim and thin because a small number of optical components are integrated in a module enables the manufacturing process. The manufacturing cost and time are significantly reduced because error signals are detected by using optical elements of FIGS. 4 and 6 without using the conventional hologram optical element.

What is claimed is:

1. An optical pickup device, comprising;
   a lead frame having an upper opening, a lower opening, an installation space formed between said upper opening and said lower opening;
   a laser source disposed within said installation space to emit a laser beam;
   an optical element disposed within said installation space to receive said laser beam, directing said laser beam through said upper opening toward an optical medium disposed above said lead frame, transmitting said beam reflected from said optical medium through lower side of said optical element, having a knife edge element formed on a portion of a surface of said optical element to block a portion of said beam reflected from said optical medium;
   a board disposed adjacent to said lower opening, attached a bottom surface of said lead frame; and
   a photo detector mounted on said board, facing said optical element to receive said beam passing through said optical element and said lower opening, detecting said beam to generate an electric signal.

2. The device of claim 1, wherein said knife edge element dividing said surface of said optical element into two sections, allowing said beam to pass through one of said two sections while preventing said beam from passing through the other one of said two sections.

3. The device of claim 1, further comprising a diffraction grating formed on said optical element, disposed to face said laser diode to divide said beam into a plurality of beams.

4. The device of claim 1, further comprising a transparent cover attached to a top surface of said optical element to cover said upper opening so as to prevent a foreign material from being introduced into said installation space.

5. An optical pickup device, comprising:
   a lead frame having an upper opening, a lower opening, an installation space formed between said upper opening and said lower opening;
   a laser source disposed within a portion of said installation space to emit a laser beam;
   an optical element disposed within said installation space to receive said laser beam, directing said laser beam through said upper opening toward an optical medium disposed above said lead frame, transmitting said beam reflected from said optical medium through a lower side of said optical element, having a concave surface formed on said lower side of said optical element to generate a different focal length depending on the curvature of said concave surface;
   a board disposed adjacent to said lower opening; attached a bottom surface of said lead frame; and
   a photo detector mounted on said board, facing said optical element to receive said beam passing through said optical element and said lower opening, detecting said beam to generate an electric signal.

6. The device of claim 5, further comprising a diffraction grating formed on said optical element, disposed to face said laser diode to divide said beam into a plurality of beams.

7. The device of claim 5, further comprising a transparent cover attached to a top surface of said lead frame to cover said upper opening so as to prevent a foreign material from being introduced into said installation space.

8. An optical pickup device, comprising:
   a lead frame having an upper opening, a lower opening, an inner space formed between said upper opening and said lower opening;
   a laser diode disposed within said inner space, mounted on said lead frame, emitting a laser beam;
   an optical element disposed within said inner space, having a first side, a second side, and a third side, a diffraction grating formed on said first side of said optical element for receiving said laser beam and dividing said beam emitted from said laser beam into a plurality of sub beams, said second side for emitting said plurality of sub beams through said upper opening to an optical medium, and said third side for emitting said plurality of sub beams reflected from said optical medium back through said optical element; and
   a board mounted with a photo diode, disposed adjacent to said lower opening to face said third side of said optical element, attached to said lead frame to receive said plurality of sub beams transmitted through said optical element.

9. The device of claim 8, further comprising a optical element support formed within said inner space of said lead frame, dividing said inner space into an upper space and a lower space defined by upper side walls and lower side walls of said lead frame, respectively, having a through hole formed on said optical element support and communicating with both said upper space and said lower space, said optical element mounted on said optical element support.

10. The device of claim 9, wherein said third side of said optical element faces said lower opening through said through hole.

11. The device of claim 8, wherein said optical element is a single body.

12. The device of claim 8, wherein said optical element being a hexahedron in shape.

13. The device of claim 8, wherein said laser diode is die-bonded to said lead frame.

14. The device of claim 8, wherein said diffracting grating is integrated with said optical element in a single body.

15. The device of claim 8, further comprising:
   an error beam generating element formed on said third side of said optical element, generating an error beam in response to said beam reflected from said optical medium and transmitted through said second side and said third side of said optical element.

16. The device of claim 15, wherein said diffraction grating, said error beam generating element, and said optical element are integrated in a single body.

17. The device of claim 15, wherein said error beam generating element is a knife edge element.

18. The device of claim 8, further comprising:
   a concave surface formed on said third side of said optical element, generating an astigmatism in response to the beam passing through concave surface.

19. The device of claim 18, wherein said concave surface is integrated with said optical element in a single body.

20. The device of claim 18, wherein said diffraction grating, said concave surface, and said optical element are integrated in a single body.

21. The device of claim 8, wherein said board disposed outside said lead frame, attached to an outer surface of said lead frame, communicating with said inside of said lead frame through said lower opening.

* * * * *